United States Patent
Scekic et al.

(10) Patent No.: US 10,247,279 B2
(45) Date of Patent: Apr. 2, 2019

(54) INTEGRATED ROLLER-GEARBOX FOR SPINNER WRENCH

(71) Applicant: DRILLFORM TECHNICAL SERVICES LTD., Calgary (CA)

(72) Inventors: Vladimir Scekic, New Westminster (CA); Todd McCorriston, Calgary (CA); Patrick McDougall, Calgary (CA)

(73) Assignee: DRILLFORM TECHNICAL SERVICES LTD., Alberta (CA)

( * ) Notice: Subject to any disclaimer, the term of this patent is extended or adjusted under 35 U.S.C. 154(b) by 227 days.

(21) Appl. No.: 15/111,881

(22) PCT Filed: Jan. 16, 2015

(86) PCT No.: PCT/CA2015/000028
§ 371 (c)(1),
(2) Date: Jul. 15, 2016

(87) PCT Pub. No.: WO2015/106343
PCT Pub. Date: Jul. 23, 2015

(65) Prior Publication Data
US 2016/0333964 A1 Nov. 17, 2016

Related U.S. Application Data

(60) Provisional application No. 61/928,863, filed on Jan. 17, 2014.

(51) Int. Cl.
*F16H 1/28* (2006.01)
*E21B 19/16* (2006.01)
(Continued)

(52) U.S. Cl.
CPC ........... *F16H 1/28* (2013.01); *B25B 13/5016* (2013.01); *B25B 21/002* (2013.01);
(Continued)

(58) Field of Classification Search
CPC ....................................................... B25F 5/001
See application file for complete search history.

(56) References Cited

U.S. PATENT DOCUMENTS 3,021,910 A * 2/1962 Martin ...................... E21B 4/02
175/106
3,391,751 A * 7/1968 Caro ....................... E02D 17/13
175/272

(Continued)

FOREIGN PATENT DOCUMENTS

WO WO 2014/179862 A1 11/2014
WO WO 2015/004385 A1 1/2015

OTHER PUBLICATIONS

International Preliminary Report on Patentability for International (PCT) Patent Application No. PCT/CA2015/000028, dated Jul. 28, 2016, 5 pages.

(Continued)

*Primary Examiner* — Tisha D Lewis
(74) *Attorney, Agent, or Firm* — Sheridan Ross PC

(57) ABSTRACT

A gearbox for a roller in a spinner wrench is provided. In some embodiments, the gearbox can be disposed internally to the roller and can include a sun and planet type epicyclical gear-reduction assembly. In further embodiments, the gearbox can include a second sun and planet type epicyclical gear-reduction assembly to provide for a second, or final, stage reduction. Some embodiments can provide for reduction-ratios close to 3:1 and can be driven by a relatively small motor. The planet gears can be used to drive an annular gear which can spin the roller. In some embodiments, the gearbox can use high-capacity bearings.

15 Claims, 5 Drawing Sheets

(51) Int. Cl.
 *B25B 13/50* (2006.01)
 *B25B 21/00* (2006.01)
 *F16H 1/46* (2006.01)

(52) U.S. Cl.
 CPC .......... *E21B 19/161* (2013.01); *E21B 19/168* (2013.01); *F16H 1/46* (2013.01)

(56) References Cited

U.S. PATENT DOCUMENTS

| | | |
|---|---|---|
| 5,704,433 A | 1/1998 | Bourner et al. |
| 6,318,214 B1 | 11/2001 | Buck |
| 7,861,618 B2 | 1/2011 | Pietras et al. |
| 2004/0237726 A1 | 12/2004 | Schulze Beckinghausen |
| 2009/0291799 A1* | 11/2009 | Scekic ............... F16H 3/72 475/269 |
| 2011/0100715 A1* | 5/2011 | Kolle ............... E21B 4/006 175/71 |
| 2012/0323500 A1 | 12/2012 | Prefontaine |
| 2016/0039017 A1* | 2/2016 | Lawlor ............... F16H 25/2252 30/228 |

OTHER PUBLICATIONS

International Search Report and Written Opinion prepared by the Canadian Intellectual Property Office dated Mar. 23, 2015, for International Application No. PCT/CA2015/000028.

\* cited by examiner

INTEGRATED ROLLER-GEARBOX FOR SPINNER WRENCH

CROSS REFERENCE TO RELATED APPLICATIONS

This application is a national stage application under 35 U.S.C. 371 and claims the benefit of PCT Application No. PCT/CA2015/000028 having an international filing date of 16 Jan. 2015, which designated the United States, which PCT application claimed the benefit of U.S. Provisional Application No. 61/928,863 filed 17 Jan. 2014, the disclosures of each of which are incorporated herein by reference.

TECHNICAL FIELD

The present disclosure is related to the field of gearboxes, and in particular gearboxes that can be used in spinner wrenches.

BACKGROUND

Automated floor wrenches, and in particular spinner wrenches, for drilling rigs are known. These existing devices do have, however, deficiencies and shortcomings. Most devices are known to have two hydraulic rams opposed to each other, each ram pushing against a pair of spinning rollers to contact, grip and spin the drilling pipe. The spinning torque is transferred from the spinning roller to the pipe by means of tangential friction force which, is by definition determined by a coefficient of friction and the resulting gripping forces acting along the lines connecting centers of each roller and the drilling pipe.

The clamping force between a spinner-roller and a tubular (such as, but not limited to a drill-pipe) can often be limited by load-capacity of the bearings supporting the roller. In addition, the maximum torque used to power a roller can ultimately be determined by the torque capacity of a gearbox used to transfer the torque from the prime mover (such as, but not limited to a hydraulic motor) to the roller itself.

A problem occurs as the maximum roller diameter can be limited by the need for rollers to all touch the drilling pipe (or other tubular) before they touch each other as adjacent rollers come together. This maximum roller diameter is consequently the determining factor for maximum envelope of most adjoining components and/or subassemblies (such as, but not limited to, roller bearings, reduction gears, and drive-motors).

As a consequence of the maximum roller diameter, rollers are typically supported by needle-roller bearings with limited load capacity. Also, due to gear-size limitations, reduction-ratios in gearboxes are typically close to 1:1 which can necessitate the use of large, powerful hydraulic motors which, in turn, can require large, powerful hydraulic power units (HPUs) and may be difficult to control.

It is, therefore, desirable to provide gearbox that can be used in an automated spinner wrench for a drilling rig that can overcome the shortcomings of prior art devices.

SUMMARY

A gearbox for a roller in a spinner wrench is provided. In some embodiments, the gearbox can be disposed internally to the roller and can include a sun and planet type epicyclical gear-reduction assembly. In further embodiments, the gearbox can include a second sun and planet type epicyclical gear-reduction assembly to provide for a second, or final, stage reduction. Some embodiments can provide for reduction-ratios close to 3:1 and can be driven by a relatively small motor. The planet gears can be used to drive an annular gear which can spin the roller. In some embodiments, the gearbox can use high-capacity bearings.

An integrated roller-gearbox for spinner wrench for use on a drilling rig is provided. In some embodiments, the integrated roller-gearbox can comprise single-stage epicyclical gear-reduction with a sun-gear rotationally connected to a prime mover such as, but not limited to, a hydraulic motor. An annulus gear can be integrated with the roller and can be supported at each end by outer races of high capacity bearings. A planet carrier housing the planet gear(s) can be rotationally grounded.

In some embodiments, the integrated roller-gearbox can comprise two-stage (i.e. a high speed and a low speed stage) epicyclical gear-reduction with a high-speed sun-gear rotationally connected to a prime mover such as, but not limited to, a hydraulic motor. A planet carrier housing the high-speed stage can be connected to, and mesh with, a sun-gear of the low-speed stage. Annulus gears of both stages can be integrated with the roller into a single component which can be supported at each end by outer races of high capacity bearings. A planet carrier housing the low-speed stage planet gear(s) can be rotationally grounded.

Broadly speaking, in some embodiments a gearbox is provided for use with a roller in a spinner wrench to spin a drill pipe or other tubular, the gearbox comprising: a first-stage sun and planet type epicyclical gear-reduction comprising a sun-gear configured for being rotationally connected to a prime mover and driven by the prime mover, the epicyclical gear-reduction further comprising at least one planet-gear in meshing arrangement with the sun-gear, the at least one planet-gear housed within a rotationally grounded planet carrier; and an annulus gear in meshing arrangement with the at least one planet-gear and configured to be in rotational communication with the roller; wherein the epicyclical gear-reduction and the annulus gear are configured to be disposed within said roller; and wherein, the sun gear drives the at least one planet-gear when the sun-gear is driven by the prime mover, the driven planet-gear in turn drives the annulus gear, which in turn rotates the roller.

Broadly speaking, in some embodiments a roller is provided for a spinner wrench to spin a drill pipe or other tubular, the roller comprising a gearbox as described herein disposed within the roller and configured to rotate the roller when the gearbox is driven.

Broadly speaking, in some embodiments a spinner wrench is provided for use to spin a drill pipe or other tubular, the wrench comprising: at least one powered roller, said roller comprising a gearbox as described herein disposed within the roller and configured to rotate the roller when the gearbox is driven.

Broadly speaking, in some embodiments a method of spinning a drill pipe or other tubular by using a spinning wrench is provided, the method comprising: driving a gearbox as described herein with a prime mover, the gearbox disposed within a roller on the spinning wrench; spinning the roller with the driven gearbox; contacting the spinning roller with the drill pipe or other tubular; and spinning the drill pipe or other tubular with the spinning roller.

Broadly speaking, in some embodiments a use of a gearbox is provided to rotate a roller of a spinner wrench in order to spin a drill pipe or other tubular, the gearbox comprising: a first-stage sun and planet type epicyclical gear-reduction comprising a sun-gear configured for being rotationally connected to a prime mover and driven by the prime mover, the epicyclical gear-reduction further comprising at least one planet-gear in meshing arrangement with the sun-gear, the at least one planet-gear housed within a rotationally grounded planet carrier; and an annulus gear in meshing arrangement with the at least one planet-gear and configured to be in rotational communication with the roller; wherein the epicyclical gear-reduction and the annulus gear are configured to be disposed within said roller; and wherein, the sun gear drives the at least one planet-gear when the sun-gear is driven by the prime mover, the driven planet-gear in turn drives the annulus gear, which in turn rotates the roller.

DETAILED DESCRIPTION OF EMBODIMENTS

A gearbox for a roller in a spinner wrench is provided. In some embodiments, the gearbox can be disposed internally to the roller and can include a sun and planet type epicyclical gear-reduction assembly. In further embodiments, the gearbox can include a second sun and planet type epicyclical gear-reduction assembly to provide for a second, or final, stage reduction. Some embodiments can provide for reduction-ratios close to 3:1 and can be driven by a relatively small motor. The planet gears can be used to drive an annular gear which can spin the roller. In some embodiments, the gearbox can use high-capacity bearings.

In some embodiments, gearboxes as described herein, can be used with rollers and spinner wrenches know in the art and those as described in U.S. 61/928,888, hereby incorporated by reference in its entirety. It would be understood that gearbox assemblies as described herein can also be used with rollers and spinner wrenches of similar functions.

Figure 1:
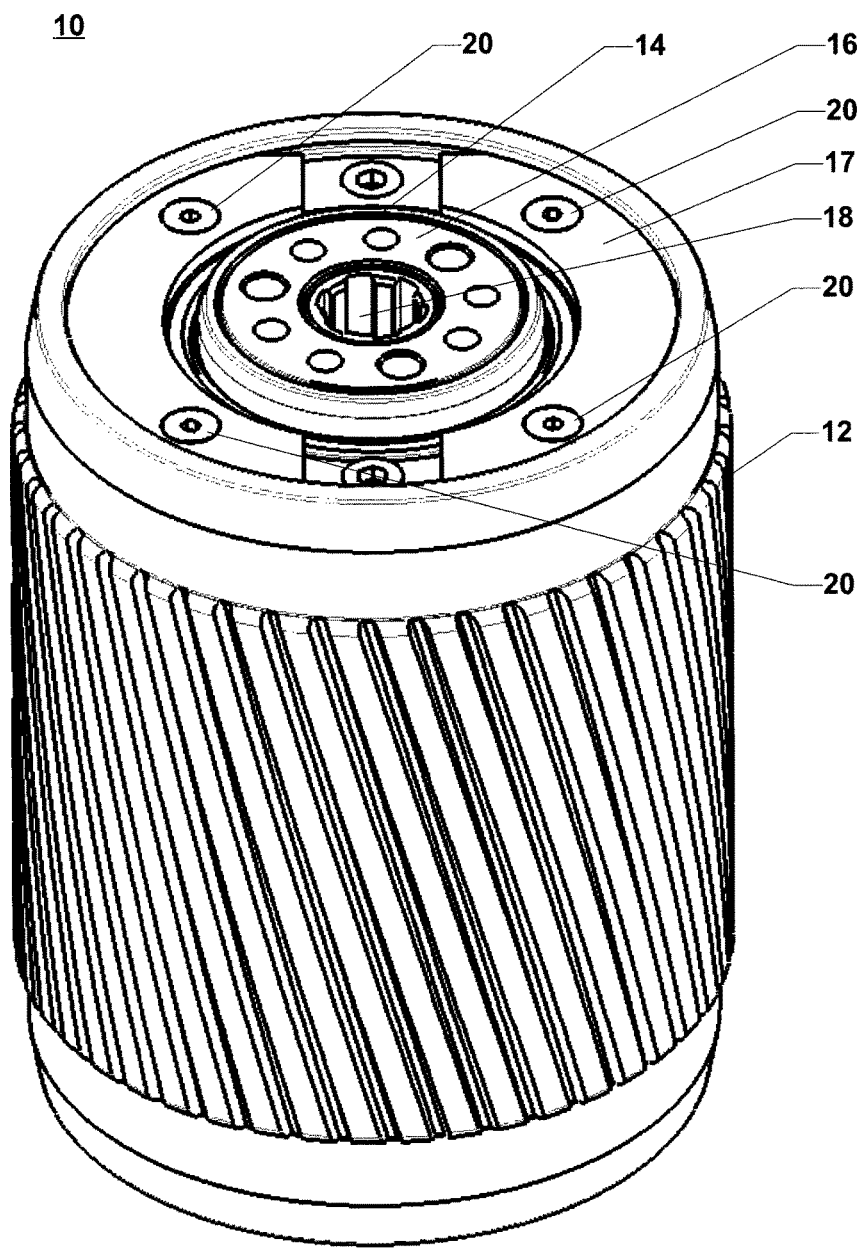
FIG. 1 depicts a front, top, isometric view of a two-stage reduction embodiment of an integrated roller-gearbox assembly with its input (motor) side facing up.

Referring to FIG. 1, an embodiment of an integrated roller-gearbox assembly 10 is depicted. Roller 12 can surround gearbox 14. Top surface 16 of gearbox 14 and the input side mounting hub 17 are shown on the upper side along with female spline detail 18 configured to receive a motor shaft.

The terms top and bottom, as well as up and down, are used herein as terms of convenience for the purposes of description, and in no way are meant to limit the invention. It would be understood that orientation of certain components can be reversed without departing from the function of assembly 10.

Input side mounting hub 17 can features boltholes for bolts 20 on the mounting face; the boltholes and bolts 20 can serve the purpose of connecting the input side mounting hub 17 to a supporting structure. Disposed coaxially with input side mounting hub 17 can be a high-speed sun gear 38 (see FIG. 4 and FIG. 5). In some embodiments sun gear 38 can comprise female serrations to connect rotationally with a prime mover 28 such as a drive motor (see FIG. 3).

Figure 2:
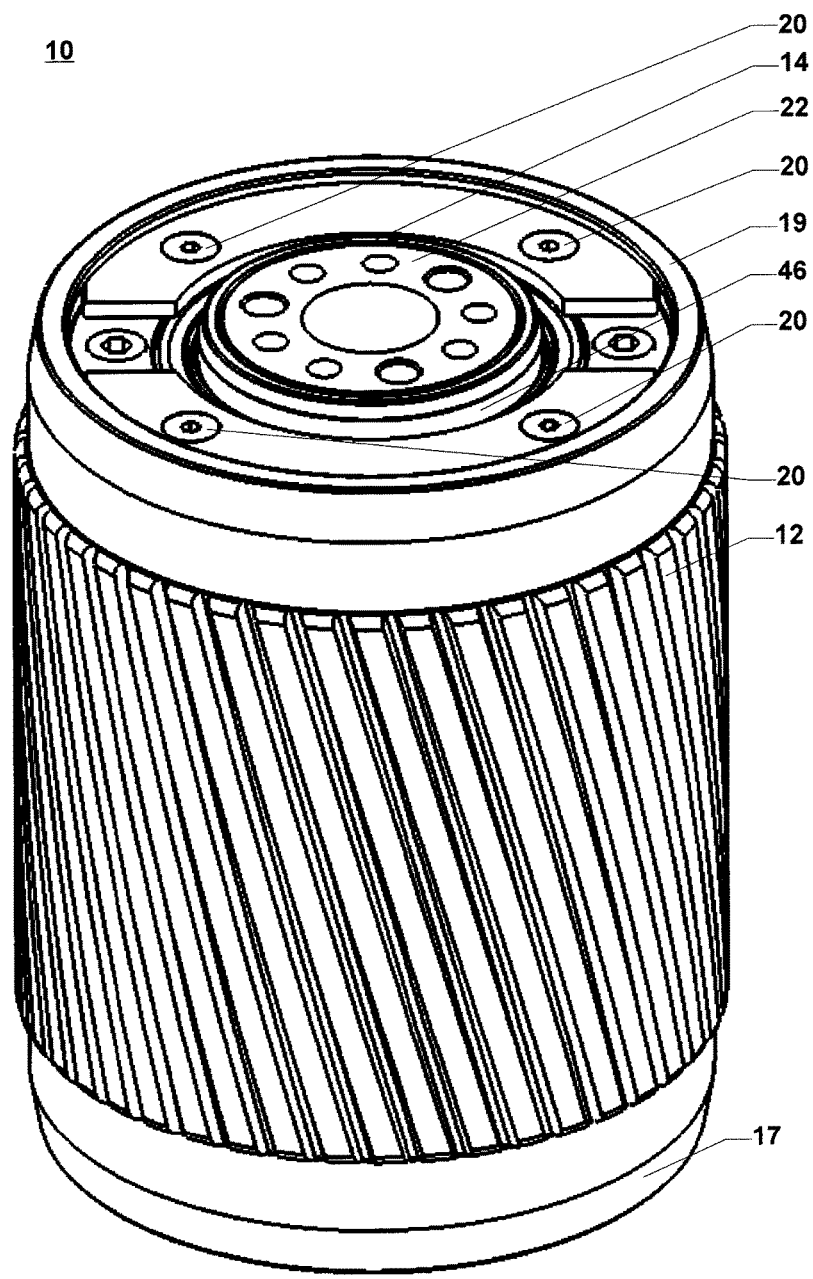
FIG. 2 depicts a front, bottom, isometric view of a two-stage reduction embodiment of an integrated roller-gearbox assembly with its final-stage carrier side facing up.

Referring now to FIG. 2, the integrated roller-gearbox assembly 10 is depicted with a final-stage planetary carrier 46 showing facing up and showing bottom surface 22 of gearbox 14. Final-stage planetary carrier 46 can also be referred to as a second-stage planetary carrier or low-speed stage planetary carrier. Final-stage planetary carrier 46 can also serve the purpose of a lower side mounting hub 19 and can feature boltholes and bolts 20 on the mounting face. The boltholes and bolts 20 can serve the purpose of connecting the lower side mounting hub 19 to a supporting structure. In some embodiments, the two mounting hubs 17, 19 can be rotationally grounded meaning that the final-stage planetary carrier 46 can be prevented from rotating.

Figure 3:
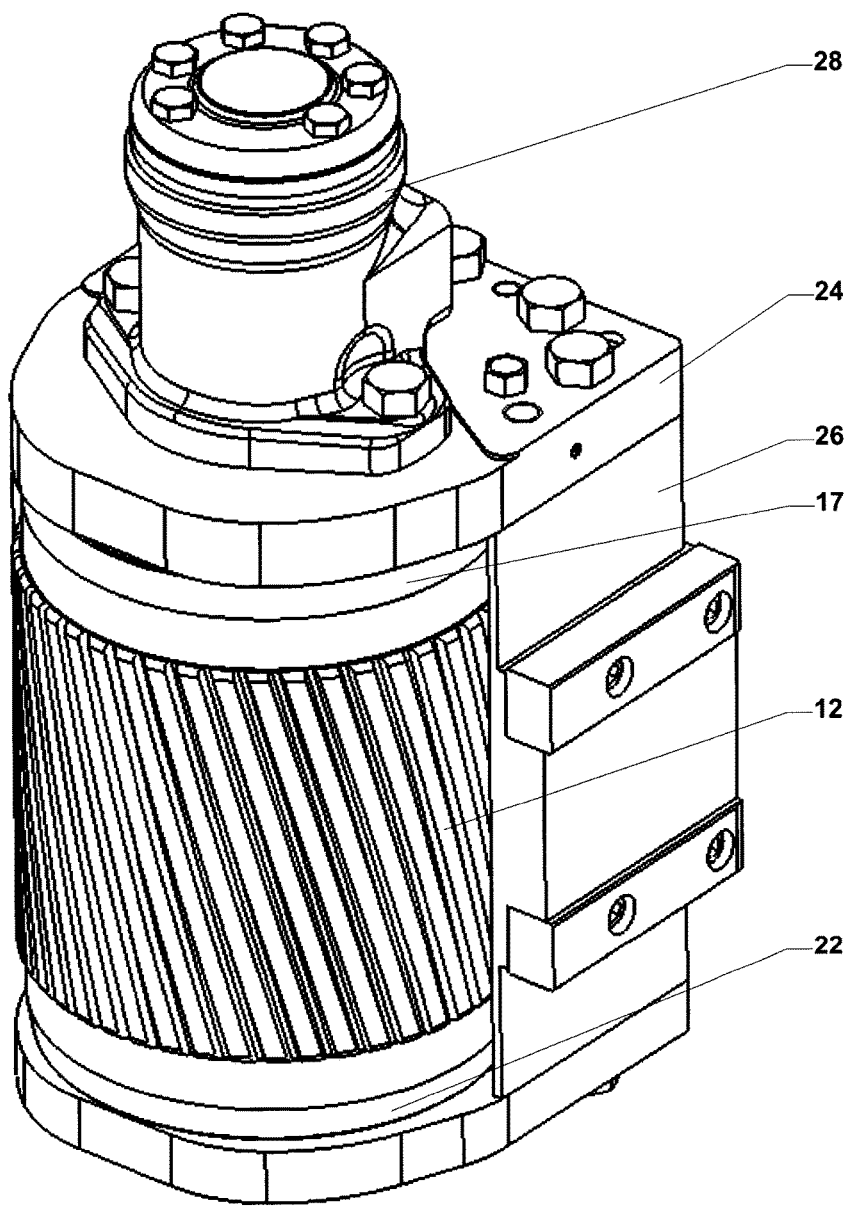
FIG. 3 depicts a front, top, isometric view of a two-stage reduction embodiment of an integrated roller-gearbox assembly with its input (motor) side facing up mounted to an embodiment of a support structure coupled with an embodiment of a drive motor depicted on the top.

In operation, integrated roller-gearbox assembly 10 can be mounted inside a supporting structure 24 and mounting bracket 26 that can also support a prime mover 28 such as a drive motor. In some embodiments, mounting bracket 26 can then further be connected to, and positioned on, a spinner wrench. One possible embodiment of such assembly 10 and support is shown in FIG. 3. The embodiment shown is for illustrative purposes only and is not meant to be limiting of the invention in any way.

Figure 4:
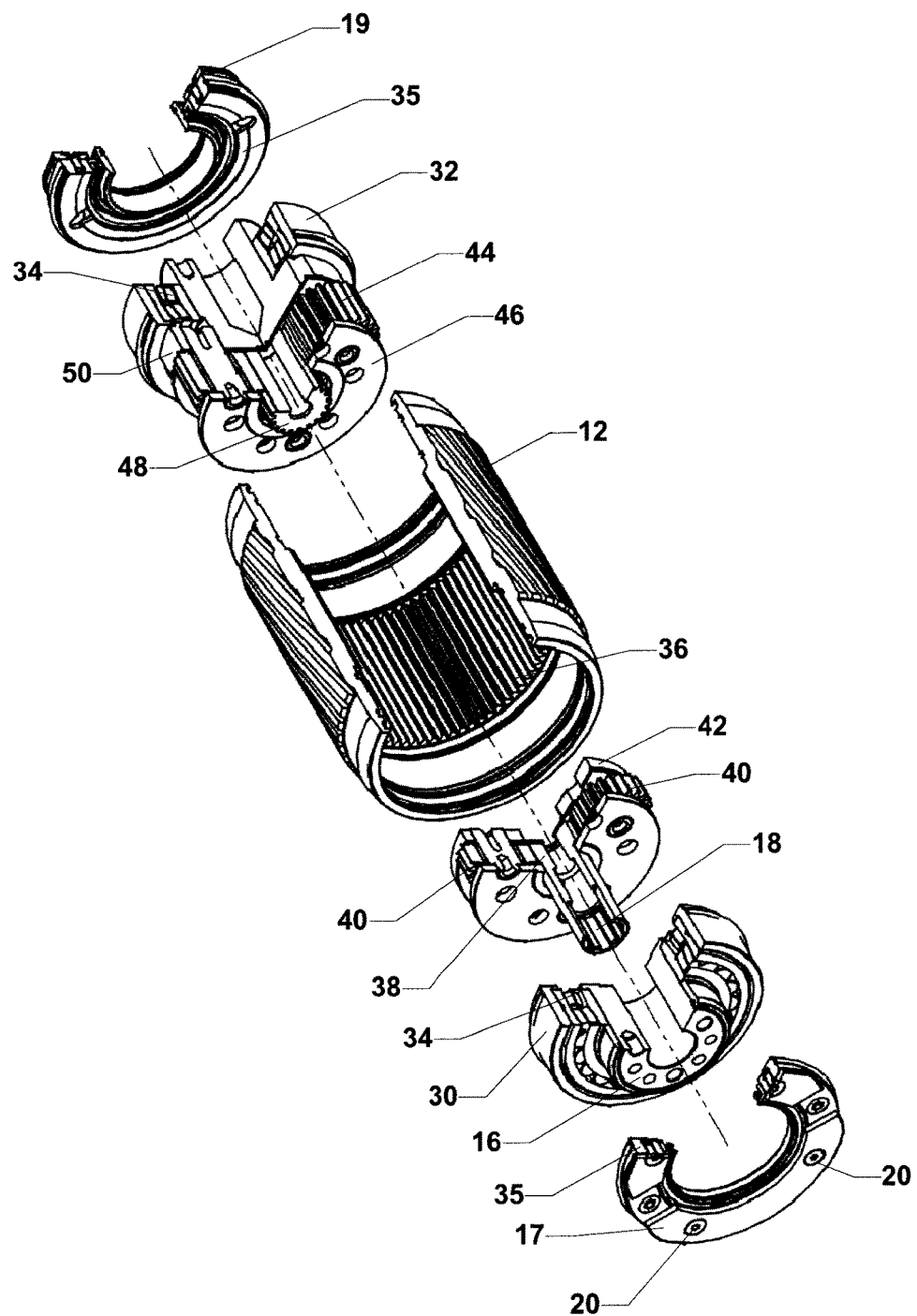
FIG. 4 depicts a three-quarter section exploded view of a two-stage reduction embodiment of an integrated roller-gearbox assembly with the input (motor) side at lower-right and final-stage carrier at the upper-left.

FIG. 4 depicts a three-quarter section exploded view of a two-stage reduction embodiment of integrated roller-gearbox assembly 10 with the input (motor) side 16 at lower-right and final-stage carrier 50 at the upper-left.

A first-stage (high-speed) sun gear 38 can be configured to be rotationally connected to a drive-motor (not shown in FIG. 4) and can be in meshing engagement with first-stage planet gears 40. In some embodiments, there can be three first-stage planet gears 40, although it would be appreciated that a different number of first-stage planet gears 40 could be used. First-stage planet gears 40 can be in meshing arrangement with the said first-stage (high-speed) sun gear 38 and with the annulus gear 36 which can be disposed within roller 12 and, in some embodiments, be an integral part of the roller 12. First-stage planet gears 40 can be disposed proximate an upper bearing connection 30 on a first-stage planet carrier 42 which can be rotationally connected to a second-stage (lower-speed) sun gear 48. The second-stage sun gear 48 can be in meshing arrangement with second-stage planet gears 44. In some embodiments, there can be three second-stage planet gears 44, although it would be appreciated that a different number of second-stage planet gears 44 could be used. Second-stage planet gears 44 can be in meshing arrangement with the said second-stage sun gear 48 and with the annulus gear 36 which can be disposed within roller 12 and, in some embodiments, be an integral part of the roller 12. Second-stage planet gears 44 can be disposed proximate a lower bearing connection 32 on the second-stage planet carrier 46 which can be rotationally grounded by the means of a bolted connection to a supporting structure (not shown in FIG. 4).

Still referring to FIG. 4, embodiments of two bearing assemblies 30, 32 are depicted, including inner-races of bearings 34, for example spherical roller bearings, mounted to their respective mounting hubs 17, 19, while the outer races can fit inside roller 12. In some embodiments, seal-carriers 35 can be disposed to the outside of each bearing assembly 30, 32 and be configured to receive seals. Such seals can be used to contain lubricant within the assembly 10 and keep contaminants outside of the assembly 10.

Figure 5:
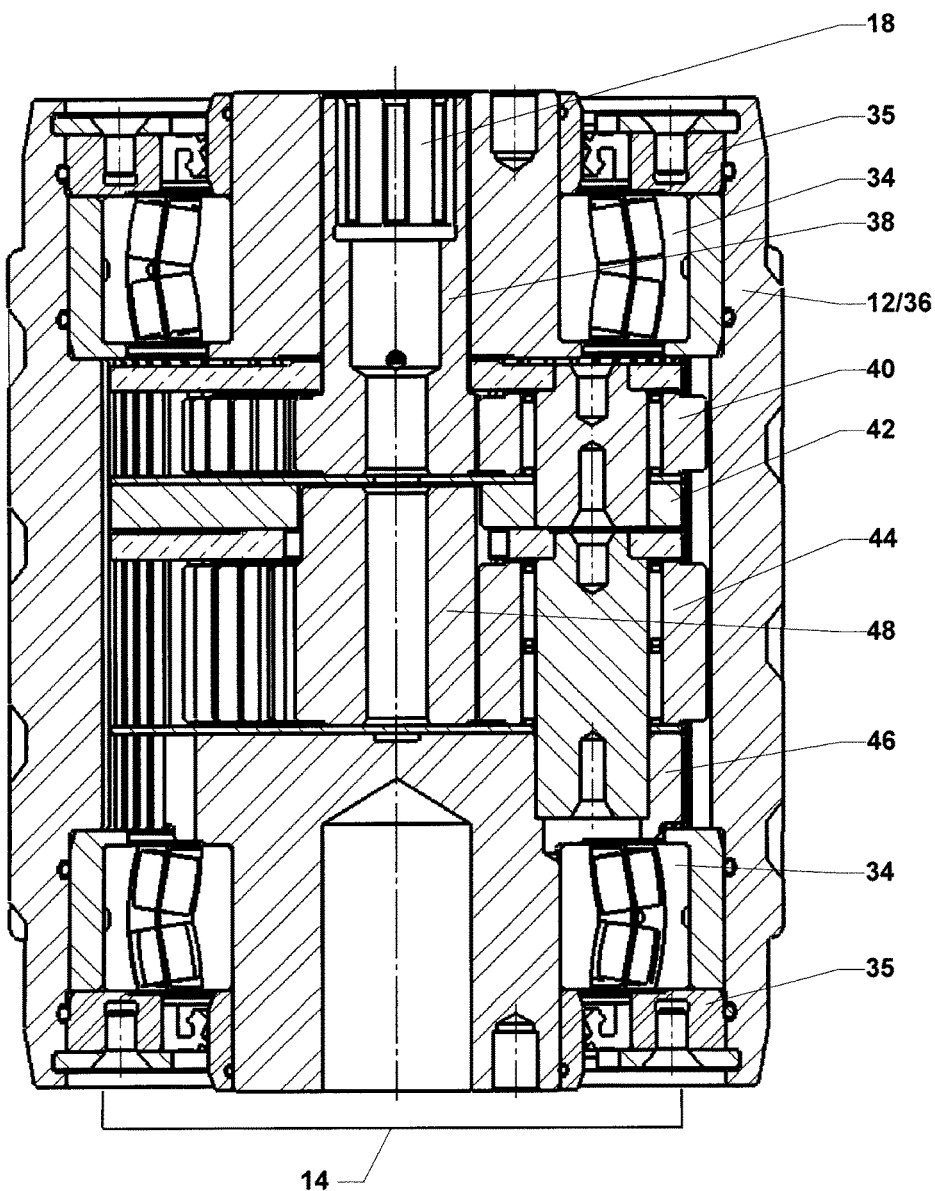
FIG. 5 depicts a sectional view of a two-stage reduction embodiment of an integrated roller-gearbox assembly with its input (motor) side facing up.

Referring to FIG. 5, a sectional view of an assembled embodiment of integrated roller-gearbox assembly 10 is shown, demonstrating the interconnection of internal components of assembly 10.

It is to be understood that the disclosure herein concentrates on one, relatively complex embodiment or example of the invention with a two-stage epicyclical reduction. However other embodiments with a simpler, single-stage epicyclical reduction can also be used. In some embodiments, the first-stage epicyclical components can be omitted altogether in which case integrated roller-gearbox assembly 10 can become a single-stage reduction, the benefits of which can become apparent.

Those skilled in the art can understand that the gearbox embodiments described herein can address concerns and/or shortcomings of a typical prior art spinner-rollers. The use of an "inside-the-roller" epicyclical reduction can provide for a high torque density which, in turn, can allow for use of smaller, less powerful, drive motors. Bearing architectures of the gearboxes with outer-race rotating (stationary inner race) can allow for use of large, high-capacity bearings which can allow higher clamping forces as compared to traditional spinner-roller designs. A high clamping force can allow for high friction between the roller and a tubular (such as, but not limited to drilling pipe). The availability of a high friction force can allow for quality torque transfer from the roller to a tubular, the torque being available by the high reduction ratio referred herein, such as reduction-ratios close to 3:1.

A method is provided for spinning a drill pipe or other tubular by using a spinning wrench, the method including driving a gearbox as disclosed herein with a prime mover, such as a hydraulic motor, where the gearbox is disposed within a roller on the spinning wrench. The driven gearbox can then spin the roller, which can then be placed in contact with the drill pipe or other tubular in order to spinning the drill pipe or other tubular with the spinning roller. The spinning of the drill pipe or other tubular can be done in a clockwise or counter clockwise manner.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A roller gearbox assembly comprising a gearbox disposed within a roller in a spinner wrench, the gearbox having a sun and planet epicyclical gear-reduction to rotate the roller to spin a drill pipe or other tubular, the gearbox comprising:
a sun-gear rotationally driven by a drive motor;
at least one planet-gear in meshing arrangement with the sun-gear, the at least one planet-gear housed within a rotationally grounded planet carrier; and
an annulus gear, disposed within the roller, in meshing arrangement with the at least one planet-gear and configured to be in rotational communication with the roller;
wherein, when driven by the drive motor, the sun gear rotates the at least one planet-gear to rotate the annulus gear, which in turn rotates the roller to spin the drill pipe or other tubular.

2. The roller gearbox assembly of claim 1, wherein the sun-gear and the at least one planet-gear provide a second-stage sun and planet epicyclical gear-reduction to rotate the roller, and the gearbox further comprises a first-stage sun and planet epicyclical gear-reduction, wherein the second-stage gear-reduction is rotationally connected to the first-stage gear-reduction, the gearbox further comprising:
a first-stage sun-gear in a meshing arrangement with at least one first-stage planet-gear, the at least one first-stage planet-gear housed within a planet carrier configured to be in rotation with the roller, and
wherein, when driven by the drive motor, the first-stage gear-reduction rotates the second-stage sun-gear, which rotates the at least one second-stage planet-gear to rotate the annulus gear which in turn rotates the roller to spin the drill pipe or other tubular.

3. The roller gearbox assembly of claim 1 further comprising high-capacity bearings in bearing assemblies.

4. The roller gearbox assembly of claim 3 wherein the bearings are spherical roller bearings.

5. The roller gearbox assembly of claim 1 wherein the gearbox produces a reduction ratio of approximately 3:1.

6. The roller gearbox assembly of claim 1 wherein the drive motor is a hydraulic motor.

7. The roller gearbox assembly of claim 1 wherein the roller gearbox assembly comprises a mounting bracket to mount the roller gearbox assembly to a supporting structure on the spinner wrench.

8. A roller for a spinner wrench to spin a drill pipe or other tubular, the roller comprising the roller gearbox assembly of claim 1 configured to rotate the roller when the roller gearbox assembly is driven.

9. A spinner wrench for use to spin a drill pipe or other tubular, the wrench comprising:
at least one powered roller, said roller comprising the roller gearbox assembly of claim 1 configured to rotate the roller when the gearbox is driven.

10. A method of spinning a drill pipe or other tubular by using a spinning wrench, the method comprising:
providing the roller gearbox assembly of claim 1;
driving the roller gearbox assembly with the drive motor;
spinning the roller with the driven roller gearbox assembly;
contacting the spinning roller with the drill pipe or other tubular; and
spinning the drill pipe or other tubular with the spinning roller.

11. The method of claim 10 wherein the drive motor is a hydraulic motor.

12. The method of claim 10 wherein the spinning of the drill pipe or other tubular is done in a clockwise manner.

13. The method of claim 10 wherein the spinning of the drill pipe or other tubular is done in a counter clockwise manner.

14. A method of using a roller gearbox assembly to rotate a roller of a spinner wrench in order to spin a drill pipe or other tubular, the roller gearbox assembly comprising a gearbox disposed within the roller, the gearbox having a sun and planet epicyclical gear-reduction, the method comprising:

providing the gearbox having
   a sun-gear rotationally driven by a drive motor, at least one planet-gear in meshing arrangement with the sun-gear, and
   an annulus gear in meshing arrangement with the at least one planet-gear and configured to be in rotational communication with the roller;
wherein the epicyclical gear-reduction and the annulus gear are configured to be disposed within the roller;
driving the gearbox with the drive motor, wherein, the sun-gear drives the at least one planet-gear when the sun-gear is driven by the drive motor, the driven planet-gear in turn drives the annulus gear, which in turn rotates the roller; and
contacting the rotating roller with the drill pipe or other tubular.

15. The method of claim 14 wherein the sun and planet epicyclical gear-reduction is a first-stage gear-reduction, and the roller gearbox assembly further comprises:
   a second-stage sun and planet epicyclical gear-reduction in communication with the first-stage sun and planet epicyclical gear-reduction; wherein, the second-stage sun-gear is in a meshing arrangement with a first-stage planet-gear and when the first-stage planet-gear is driven, the second-stage sun-gear is driven and in turn drives at least one second-stage planet-gear, said second-stage planet-gear in meshing arrangement with the annulus gear.

* * * * *